United States Patent [19]

Raquet

[11] 4,364,594
[45] Dec. 21, 1982

[54] RAILWAY WHEEL VIBRATION DAMPING DEVICE

[75] Inventor: Erwin Raquet, Witten, Fed. Rep. of Germany

[73] Assignee: Fried. Krupp Huttenwerke AG, Bochum, Fed. Rep. of Germany

[21] Appl. No.: 64,894

[22] Filed: Aug. 8, 1979

[30] Foreign Application Priority Data

Aug. 10, 1978 [DE] Fed. Rep. of Germany ....... 2835020

[51] Int. Cl.³ .......................... B60B 17/00; B60C 7/06; F16F 15/12; F16H 55/14
[52] U.S. Cl. .......................................... 295/7; 74/574; 105/452; 181/209; 181/211; 295/11; 295/31 R; 301/6 WB
[58] Field of Search ................ 295/31 A, 7, 11, 31 R; 64/1 V; 74/574; 105/452; 181/209, 211, 258, 266, 276; 188/1 B, 218 A; 192/30 V; 238/382; 301/6 WB

[56] References Cited

U.S. PATENT DOCUMENTS

| | | | |
|---|---|---|---|
| 1,782,285 | 11/1930 | Bourdon | 295/31 R |
| 1,840,898 | 1/1932 | Gunn | 295/7 XR |
| 1,985,144 | 12/1934 | Bugatti | 295/11 |
| 3,327,812 | 6/1967 | Lazan | 188/1 B |
| 3,986,747 | 10/1976 | Raquet et al. | 295/7 |
| 4,183,572 | 1/1980 | Abbrecht et al. | 105/452 |
| 4,203,546 | 5/1980 | Raquet et al. | 188/1 B |

FOREIGN PATENT DOCUMENTS 1357309 2/1964 France .................. 295/11

Primary Examiner—Bruce H. Stoner, Jr.
Assistant Examiner—Howard Beltran
Attorney, Agent, or Firm—McAulay, Fields, Fisher, Goldstein & Nissen

[57] ABSTRACT

A vibration damping device for a body resonant at two frequencies, is formed by a plate which can be connected to the body transversely with respect to its vibration direction. A post extends from the plate and mounts one end of an elastically flexible tongue which extends from the post substantially parallel to the plate so as to form a space between the tongue and plate. A weight is fixed to the other end of the tongue and vibration damping material is positioned in the space. The tongue and weight form a system resonant at both of the bodies' resonant frequencies, the tongue's energy being absorbed by the damping material.

13 Claims, 5 Drawing Figures

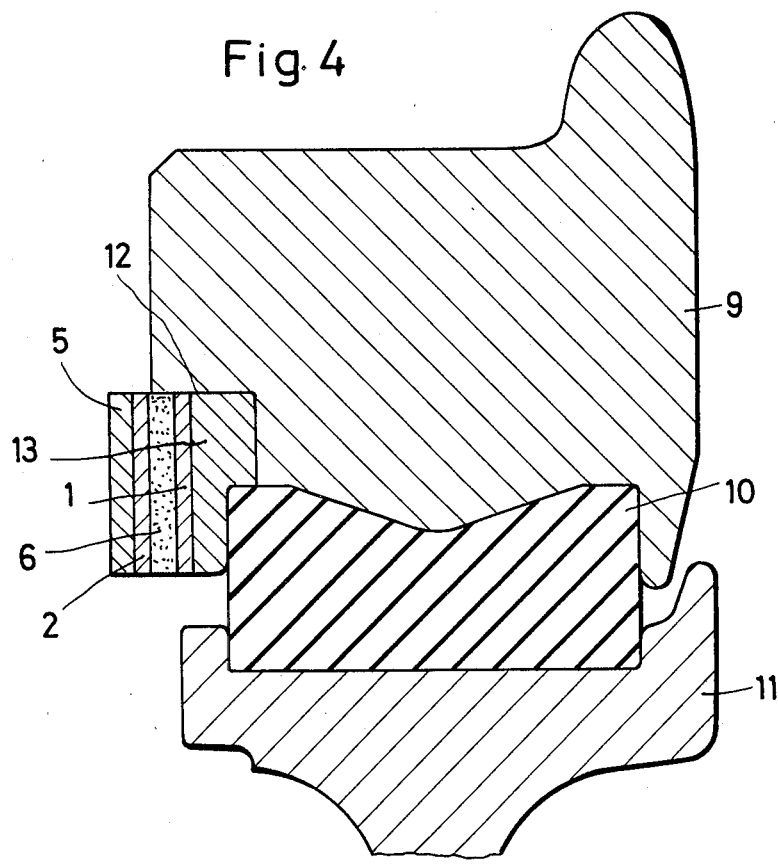
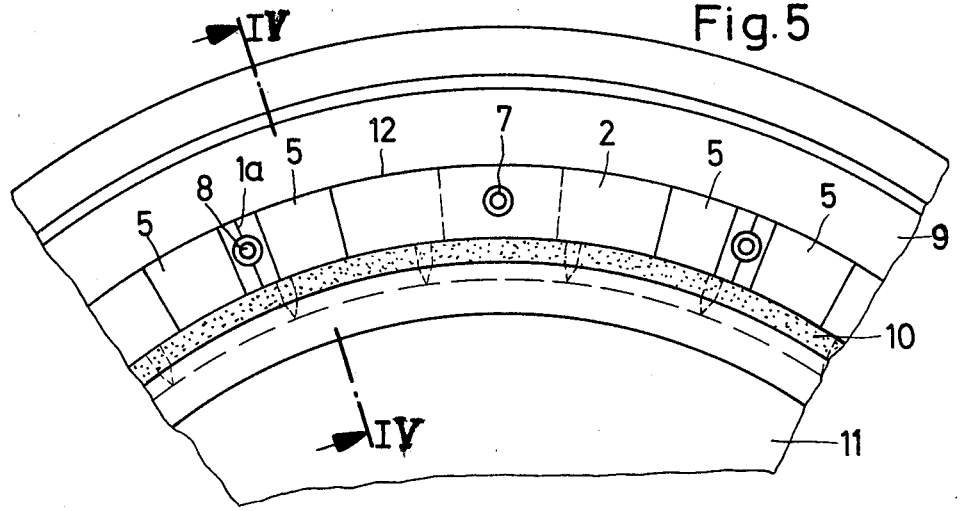

4,364,594

RAILWAY WHEEL VIBRATION DAMPING DEVICE

BACKGROUND OF THE INVENTION

Resonant bodies can have two or more resonance frequencies making the design of a damping device for such a body difficult if the device is to be compact as well as effective.

One example of such a body is a steel railroad wheel which when negotiating a curved rail in particular, creates a loud screeching noise due to the wheel's rim being a resonant body excited by the vibration of the wheel rim scrubbing on the rail. A railroad wheel conventionally consists of the hub which is pressed on the railroad wheel axle, the web which radiates in the form of a disk from the hub, and the rim mounted by the web's periphery and having the tread and flange for running on the rail.

Particularly when the wheel is of the type having the rim forming a separate part of the wheel and connected to the web's periphery by a ring of non-metallic elastic material having the characteristic of rubber, the rim forms a resonant body which in the axial direction of the wheel resonates when excited, with both a low or fundamental frequency, or first mode, and a second higher pitched frequency, or first harmonic, or second mode. Higher harmonics may be involved but are of such low energy as to be unobjectionable from the noise viewpoint. In other words, the railroad rim can resonate objectionably at two frequencies, a relatively low frequency and a higher frequency, so as to cause the objectionable noise.

Proposals have been made to damp such a multi-frequency resonant body, but none has been completely satisfactory. One proposal has been to use at least two elastic metal tongues mounted at their ends and respectively tuned to the different frequencies of the resonanting body, non-metallic damping material between the tongues absorbing the energy and providing effective damping of the two vibrations of different frequencies.

The above proposal is satisfactory from the viewpoint of absorbing the energy of the resonant vibrations of differing frequencies. However, this design is not satisfactory for application to a railroad wheel rim, such as by using a multiplicity of the devices in an annular array with each device fixed to the rim, because the stacked tongues involved unacceptable thickness or height. That is to say, railroad truck assembly has various parts which cannot be cleared with assurance by such a bulky device unless the rim is recessed so the device can be nested deeply within the rim. Particularly in the case of the wheel type having the rim mounted by the web via rubber, the machining of such a necessarily deep annular recess in the rim can weaken the rim to an unacceptable extent.

The object of the present invention is to improve on the proposal to use the stacked tongues, so as to obtain the multifrequency absorption advantage but at the same time to provide a more compact device particularly adapted for use as an annular array of the devices fixed to the rim of a railroad wheel and especially when the rim is rubber mounted on the wheel web.

SUMMARY OF THE INVENTION

This improvement comprises a flat elongated metal plate adapted to be connected to the body having the dual frequency resonance characteristic. If that body is a railroad wheel rim, the plate can be curved to provide an arc having the rim's radius. In any event, the plate should be positioned transversely with respect to the direction of the vibrations involved, which would be axial in the case of a railroad wheel rim.

A metal post extends from the plate in the direction of the vibrations, or transversely with respect to the plate, and this post is in the form of a flat metal piece and can have a thickness no greater than that of the plate which itself need only be thick enough to insure its rigidity and structural strength. A single flat metal tongue extends transversely from the post and therefore with respect to the vibration direction so as to form a space between the tongue and plate. This tongue can be also a flat elongated metal plate having substantially the dimensions of the mounting plate, excepting that it may be of less thickness. The mounting plate is provided with an arrangement for rigidly connecting it at both ends to the vibrating body with the tongue's end only rigidly connected to the post which is itself rigid. The tongue extends from the post in the form of a cantilever with its other end free so that the tongue functions as a reed. The space between the tongue and the base plate contains non-metallic vibration absorbing material which absorbs and damps the motion of the tongue. The tongue can be tuned to one of the resonant frequencies characterizing the vibrating body, but according to past thinking would require a second tongue stacked on top with more intervening non-metallic damping material, resulting in the objectionable thickness or weight.

To eliminate the formerly necessary second tongue, it has been found that with the single tongue described, mass or weight added to the free end portion of the tongue can make the tongue resonant to two different frequencies. In the case of the railroad wheel rim, this would be the fundamental and first harmonic frequency of the rim's natural resonances. To provide the mass or weight, a flat elongated metal plate of shorter length than the tongue is rigidly fixed directly to the top or outer face of the single tongue. The plate providing the mass should extend from the free or working end of the tongue partly to the tongue's fixed end mounted by the post, the non-metallic damping material being of shorter length than the tongue's working length and positioned between and in contact with the tongue and the base plate at various locations.

The weighted single tongue, by its length, the length and, therefore, the weight of the weight plate, and the positioning of the damping material sandwiched between the tongue and base plate, can be tuned for resonance at both of the two different frequencies.

A specific example of this new vibration damping device is illustrated by the accompanying drawings and described in detail hereinafter.

DESCRIPTION OF THE DRAWINGS

FIG. 4 is a cross section taken on the line IV—IV in FIG. 5; and

FIG. 5 is a front view of a railroad wheel of the rubber mounted rim type and showing an annular array of the new devices installed on the rim.

DETAILED DESCRIPTION OF THE INVENTION

Figure 1:
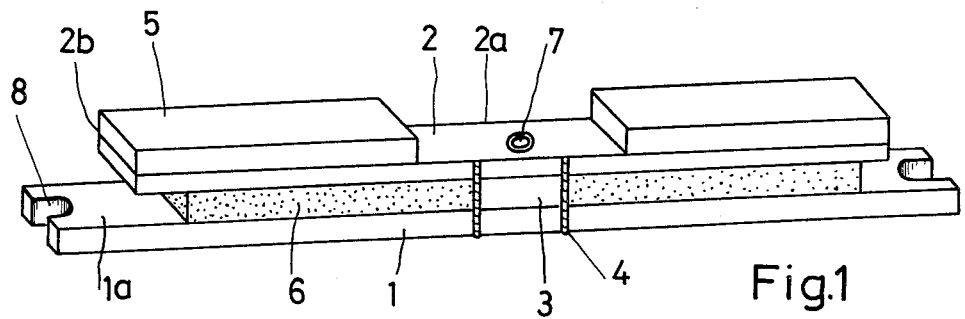
FIG. 1 is a perspective view of the new device.

The illustrated construction combines two of the new vibration damping devices into a single unit.

Consequently, the flat elongated metal plate 1 which forms a mounting or base plate is in this instance of double length and a single flat metal plate 2 is centrally mounted by the flat metal post 3 so as to form two oppositely extending tongues 2b. All of these parts are integrally interconnected by welding 4 and each tongue has fixed to its free or vibrating end one of the weights 5 which is also in the form of a flat metal plate. The post 3 spaces each tongue from the base plate 1 and the tongues and base plate are parallel with each other, the tongues and base plate defining between them spaces within which the vibration absorbing or energy absorbing non-metallic material 6 is positioned. A central hole 7 is formed through the mounted end 2a of the tongues and the post, and the opposite ends of the base plate 1 are provided with recesses 8, these passages being for receiving cap screws or the like for attaching the device to the vibrating body to be damped.

All of the parts, excepting for the non-metallic material 6, can be made of steel, and the flat plates providing the masses or weights 5 can be welded to the tongues 2, in each instance.

The transverse widths of all of the parts can be the same. The thickness of the tongues and the weights 5 would normally be at most no greater than the thickness of the base plate 1, the thickness used depending on the tuning desired. The flat plates 5 extend from the free ends 2b of the two tongues toward the centrally mounted or rigid part 2a of the two tongues but are spaced from this part to form a flexible area for the tongues between the inner ends of the plates 5 and the rigid part 2a from which the two tongues extend in opposite directions in the form of cantilevers so as to form reeds. Normally the two tongues will have less thickness than the base plate 1. The non-metallic energy-absorbing material 6 is, of course, in contact with the base plate and tongues, and this material may comprise any of those used for vibration damping such as a silicone rubber.

Because the base plate can be rigidly mounted at both ends and its middle via the screw passages 7 and 8, the base plate need not be thick enough to make it longitudinally rigid per se. The thickness and length of each tongue and weight depend on the resonance desired. The flat energy-absorbing material sandwiched between the tongue and base plate need only be thick enough to provide the desired degree of damping. All parts are flat so the overall height or profile is kept at a minimum.

Figure 2:
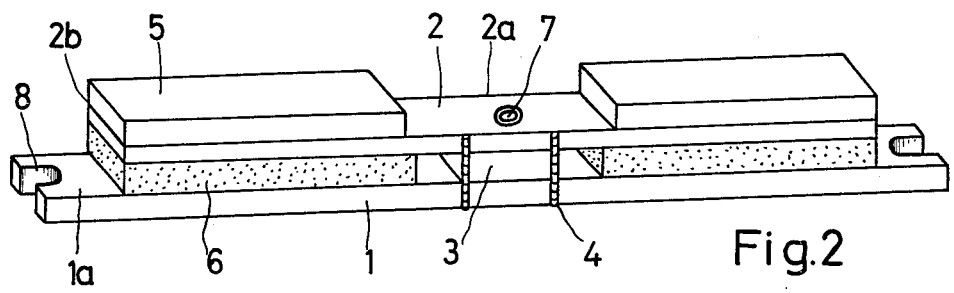
FIG. 2 is the same as FIG. 1 but shows the device as it would be tuned for frequencies different from those of the FIG. 1 arrangement.
Figure 3:
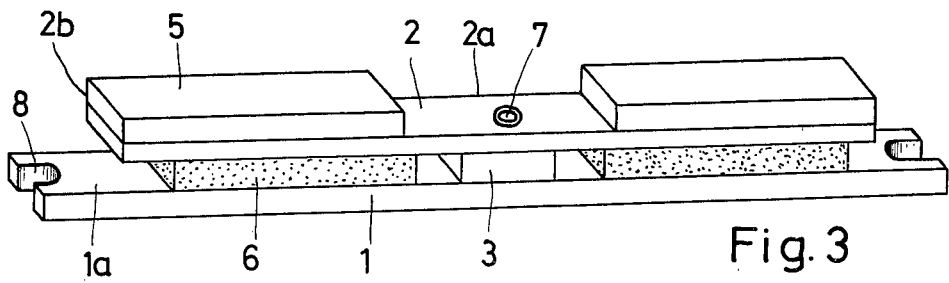
FIG. 3 is the same as FIGS. 1 and 2 but shows tuning to still other differing frequencies.

As previously noted, the tongues 2 with their masses 5 can be designed to be resonant at two different frequencies. Fine tuning can be obtained by the position and extent of the sound-absorbing material 6, FIG. 1 showing this material extending from the post 3 almost to the end 2b of the tongue is each instance, FIG. 2 showing the material 6 extending from the end 2b of each tongue almost to the post 3, while FIG. 3 shows a relatively short length of the damping material 6 positioned so that both of its ends are spaced from the tongue ends 2b and the flexing part of the tongue adjacent to the post 3, in each instance. In all cases, the device is absorbant to two frequencies, each tongue and weight having two resonance frequencies, one which is higher and another which is lower.

FIGS. 4 and 5 show a railroad wheel wherein the outer steel rim 9 is mounted via an annular rubber ring 10 to the inner rim 11 connected to a web of a railroad wheel, the balance of the web and the hub not being shown. The rim 9 is formed with a recess 12 which can be of tolerable depth and in which a steel ring or annulus 13 is shrunk by thermal methods. Although not illustrated, this ring can be provided with threaded holes for receiving the necessary fastening screws, without resulting in local stress concentrations in the rim 9.

FIG. 5 shows that in this instance the base plate 1 is curved to the radius of the rim 9, particularly of the ring 13, and that an annular array of the devices are fixed in the recess 12 by cap screws (not shown) passed through the central hole 7 of each device and with the base plates 1 butted end-to-end by cap screws passed through the recesses 8 which cooperatively form screw holes from one device to the other.

As shown by FIG. 4, the lower profile made possible by the use of only one tongue instead of two, results in the device presenting a low profile on the outer side of the rim 9, because the use of two layers of the vibration of absorbant material is reduced to one layer.

The railroad rim 9 can be assumed to have the characteristic fundamental and first harmonic, and higher but immaterial harmonics, of resonance possibility. The vibratory motion is in the axial direction of the rim. The vibration via the ring 13 and post 3 of each device excites each tongue and its weight 5 which overhangs the post 3, and with the parts designed to have the same fundamental resonance and first harmonic these parts resonate at the same frequencies. Energy is absorbed by the damping material 6 so that, in turn, the resonant vibrations of the rim 9 are damped and the objectionable noise substantially reduced.

What is claimed is:

1. A vibration damping device for a vibrating body for damping vibrations, comprising:
   a plate adapted to be connected to said vibrating body said plate lying in a plane orthogonal to vibration direction with respect to vibrating direction of said body;
   an elastically flexible tongue member extending transversely to said plate, and means fixing a portion thereof to said plate and spaced therefrom to form a space between said tongue member and said plate;
   a vibration absorbing material in said space; and
   weight means fixed to a free end portion of said tongue member whereby said tongue member is resonant to two different frequencies.

2. The damping device as claimed in claim 1, including means for attachment to said vibrating body.

3. The vibration damping device of claim 1, wherein said vibration damping material extends over only part of said space between said plate and said tongue member.

4. The vibration damping device as claimed in claim 1, wherein said plate, said tongue and said weight are flat metal parts so that said device has a low profile.

5. The vibration damping device as claimed in claim 1 or 4, wherein said fixing means includes a flat metal post mounting said tongue to said plate to form two oppositely extending cantilever tongue parts, and a weight is fixed to the free end of each of said oppositely extending tongue parts.

6. The vibration damping device as claimed in claim 1, wherein said tongue member includes a central portion having two oppositely extending tongue parts each with a free end;

said weight means including one weight being fixed to one of said free ends, and another weight fixed to the other of said free ends; and said fixing means including a flat metal post fixing said central portion to said plate.

7. The damping device as claimed in claim 1 or 6, wherein said tongue member and said plate are parallel with each other; and the thickness of said weight means and said tongue member is equal to or less than the thickness of said plate, depending upon the tuning desired.

8. The vibration damping device as claimed in claim 1 or 6, wherein said elastically flexible tongue member is a single tongue which together with said weight means forms a resonance system resonant to a basic frequency and a first harmonic of the basic frequency of the vibrating body.

9. In a vibration damping device for attachment to a vibrating body of a railroad wheel, said railroad wheel having a metal rim, a web, and an elastomeric material between said rim and said web, said rim being said vibratory body of said railroad wheel, the improvement comprising:

a plate, an elastically flexible tongue member with weight means at a free end thereof and spaced from said plate, a vibration absorbing material in a free space between said plate and said elastically flexible tongue member, and means fixing all of the aforesaid together with said flexible tongue member forming and said weight means forming a vibrating member to dampen two frequencies of vibration of said rim; and means coupling said plate, said elastically flexible tongue member, said weight means and said fixing means to said metal rim, said fixing means being centrally mounted and said coupling means fixedly coupling said vibrations damping device to said rim at said fixing means of said vibration damping device to permit vibration of said tongue member on both sides of said coupling means, said coupling means extending in a direction transversely with respect to the vibrating direction of said rim.

10. In the vibration damping device of claim 9, wherein said vibration damping device is adapted to be connected transversely with respect to the body's vibration direction; and said fixing means dividing said flexible tongue member into two oppositely extending tongue cantilevered tongue parts with weight means at the free ends thereof and positioned on opposite sides of said coupling means.

11. In the vibration damping device as claimed in claim 9, including additional coupling means including recesses in said plate for fixing the ends thereof to said rim; and said coupling means including a central opening in said elastically flexible member in a central portion thereof between the opposite ends thereof for fixing the central portion of said elastically flexible member and the central portion of said plate to said rim.

12. In the vibration damping device as claimed in claim 11, wherein the vibration damping material extends over only part of the whole length of said tongue and on opposite sides of said coupling means.

13. In a vibration damping device as claimed in claim 9 or 12, wherein said elastically flexible tongue member is a single tongue, which together with said weight means forms a resonance system resonating at a basic frequency and a first harmonic of the basic frequency of the vibrating body of the railroad wheel.

* * * * *